No. 889,169. PATENTED MAY 26, 1908.
L. ALVERSON & R. L. HORSLEY.
BALE TIE.
APPLICATION FILED JULY 15, 1907.
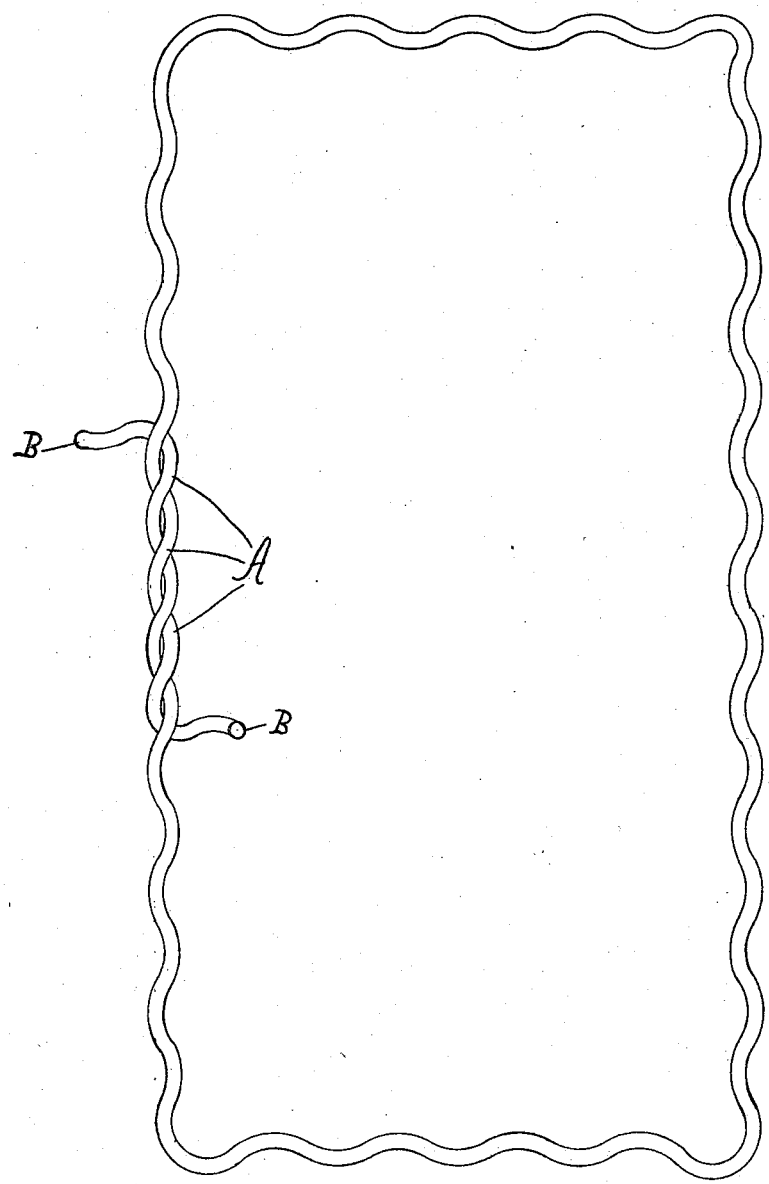

UNITED STATES PATENT OFFICE.

LEWIS ALVERSON AND ROBERT L. HORSLEY, OF FORT WORTH, TEXAS.

BALE-TIE.

No. 889,169.      Specification of Letters Patent.      Patented May 26, 1908.

Application filed July 15, 1907. Serial No. 383,806.

*To all whom it may concern:*

Be it known that we, LEWIS ALVERSON and ROBERT L. HORSLEY, both of Fort Worth, Texas, have invented a new and Improved Bale-Tie, of which the following is a specification.

This invention relates to ties for bales of cotton and hay and other goods, and the object is to provide a tie of great strength and durability and which is inexpensive and to provide a tie which forms or carries its own fastening means and which needs no clamp or buckle.

Another object is to provide a tie which can be put on a bale in the shortest possible time and which will hold the bale securely.

One of the advantages of this tie is that it can be used by ginners for binding the bale at the gin and the same tie can be used to bind the bale at the compress after the bale has been compressed.

Other objects and advantages will be fully explained in the following description and the invention will be more particularly pointed out in the claims.

Reference is had to the accompanying drawing which forms a part of this application and specification.

The figure of drawing is a perspective view of a tie as applied to a bale, the wire being shown on a large scale.

The wire is formed into a spiral from end to end. Each tie is complete in itself. A wire is cut to the proper length and spiraled or spiraled and then cut to the proper length. When the tie is placed around the bale the ends B are meshed together as shown at A to form a tie. The tie will hold against great expansion of the bale by simply meshing the ends together, but under unusual strain the ends might pull apart. To prevent any possibility of the ends being pulled apart, the ends B are bent substantially at right angles and care must be taken to bend the ends under the wire as shown. The ends B are extended some distance from the bend and made to lie against the side of the bale. The ends thus form a brace to prevent the wire from turning and pulling apart. If the ends were not bent, under very great strain, they would turn and separate. When the ends are bent and are resting against the side of the bale, it will be impossible to pull the ends apart without breaking the wire. The ties may be used on bales of cotton by ginners as the bales are put up at the gin and the same wires can be used at the compress to bind the bales after they have been compressed. It may be necessary to clip off parts of the ends for the compressed bale. This can be done because the wire is spiral throughout its length and any part of the tie will form a tie.

Having fully described our invention, what we claim as new and desire to secure by Letters Patent, is,—

1. A bale tie comprising a wire spiraled throughout its length and having portions thereof adapted to be meshed together and the ends thereof bent substantially at right angles.

2. A bale tie comprising a wire having spiraled ends thereof adapted to be meshed together to form a tie and the ends beyond the tie bent substantially at right angles to rest against the side of the bale to prevent the turning of the wire.

In testimony whereof, we set our hands in the presence of two witnesses, this 3rd day of July, 1907.

LEWIS ALVERSON.
              ROBERT L. HORSLEY.

Witnesses:
    A. L. JACKSON,
    J. W. STITT.